United States Patent
Giese

(10) Patent No.: US 11,787,010 B2
(45) Date of Patent: Oct. 17, 2023

(54) METHOD FOR GRINDING A SURFACE OF A WORKPIECE AND DEVICE THEREFORE

(71) Applicant: Karl Heesemann Maschinenfabrik GmbH & Co. KG, Bad Oeynhausen (DE)

(72) Inventor: Christoph Giese, Herford (DE)

(73) Assignee: KARL HEESEMANN MASCHINENFABRIK GMBH & CO. KG, Bad Oeynhausen (DE)

( * ) Notice: Subject to any disclaimer, the term of this patent is extended or adjusted under 35 U.S.C. 154(b) by 112 days.

(21) Appl. No.: 17/381,242

(22) Filed: Jul. 21, 2021

(65) Prior Publication Data

US 2022/0023993 A1  Jan. 27, 2022

(51) Int. Cl.
- B24B 49/12 (2006.01)
- B24B 1/00 (2006.01)
- B24B 49/04 (2006.01)
- G06T 7/00 (2017.01)

(52) U.S. Cl.
CPC ............... *B24B 49/12* (2013.01); *B24B 1/00* (2013.01); *B24B 49/04* (2013.01); *G06T 7/001* (2013.01)

(58) Field of Classification Search
CPC ......... B24B 49/12; B24B 49/04; B24B 49/02; B24B 49/14; B24B 49/16; B24B 49/003; B24B 49/00; B24B 49/10; B24B 49/03; B24B 1/00; B24B 21/008; B24B 21/18; B24B 21/04; B24B 21/06; B24B 21/10; B24B 51/00; B24B 7/06; B24B 7/242; B24B 7/244; B24B 7/28; B24B 27/0023; B24B 27/0076; G06T 7/001

USPC .............................................................. 451/5
See application file for complete search history.

(56) References Cited

U.S. PATENT DOCUMENTS

| | | | | |
|---|---|---|---|---|
| 6,102,781 A | * | 8/2000 | Greathouse | B24B 21/04 451/299 |
| 2004/0235391 A1 | * | 11/2004 | Grivna | B24B 21/04 451/8 |
| 2019/0224804 A1 | | 7/2019 | Friebolin et al. | |
| 2019/0275636 A1 | * | 9/2019 | Giese | B24B 21/008 |
| 2019/0275637 A1 | * | 9/2019 | Giese | B24B 49/12 |
| 2020/0122290 A1 | * | 4/2020 | Bettermann | B24B 21/14 |
| 2020/0361049 A1 | * | 11/2020 | Tsukanov | B24B 51/00 |

FOREIGN PATENT DOCUMENTS

| | | |
|---|---|---|
| DE | 3402104 C2 | 7/1986 |
| DE | 19915909 C2 | 5/2003 |
| DE | 102010011470 B4 | 2/2016 |
| DE | 102016116622 A1 | 3/2018 |

(Continued)

*Primary Examiner* — Joel D Crandall
*Assistant Examiner* — Michael A Gump
(74) *Attorney, Agent, or Firm* — WCF IP

(57) ABSTRACT

Grinding a surface of a workpieces is accomplished with a grinding machine having at least two grinding units. First, a target structure of the surface to be achieved is provided. Then, using predetermined grinding parameters, a first of the two grinding units is used to grind the surface of the structure. Then, the surface of the actual structure is captured and compared to the target structure. Based on the comparison, the grinding parameters are adjusted and the surface is then ground, using the adjusted parameters, with the second of the two grinding units.

8 Claims, 2 Drawing Sheets

(56) References Cited

FOREIGN PATENT DOCUMENTS

Figure 1:
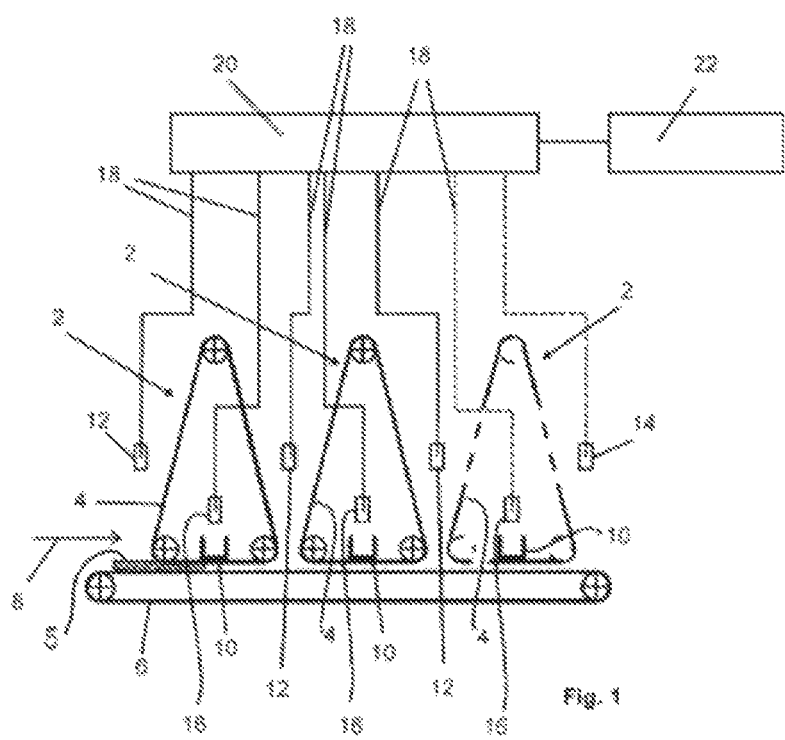

| DE | 102017106548 A1 | 9/2018 |
| DE | 102017208498 A1 | 12/2018 |
| DE | 102018202618 A1 | 8/2019 |
| DE | 102018105133 A1 | 9/2019 |

\* cited by examiner

METHOD FOR GRINDING A SURFACE OF A WORKPIECE AND DEVICE THEREFORE

Method for grinding a surface of a workpiece and device therefor

The invention relates to a method for grinding a surface of a workpiece by means of a grinding machine comprising at least two grinding units. The invention also relates to a device for carrying out such a method.

In the surface processing of wood, metal and special materials, such as paper combs, grinding machines are used both for surface grinding and for edge and profile processing. Due to the high demand for workpieces and objects that are as individual as possible, batch sizes are decreasing here, so that a large variation occurs both in the base material and in the desired end product. Even with large batch sizes and workpieces to be produced in large quantities, variations can occur in the grinding process, which can be caused, for example, by wear of the abrasives used, differences in the workpieces to be ground, for example in the thickness on applied layers, dimensions or variations in color, and a number of other parameters.

In order to obtain the best possible grinding result for each workpiece, these variations and changes must be taken into account and the respective grinding process adapted accordingly. A number of different approaches are known from the prior art to make this possible, at least to some extent.

From DE 34 02 104 C2, for example, a belt grinder is known whose pressure beam, which applies the abrasive to the workpiece to be ground, is divided into a plurality of pressure shoes arranged next to each other, which can be controlled separately and independently of each other. In this way, the pressure applied to the workpiece to be ground can be made location-dependent. The pressure applied by the respective pressure shoe is determined in particular by the shape of the workpiece to be ground as well as local and temporal data of the transport process.

DE 10 2018 105 133 A1 describes a method for operating a grinding device in which, after grinding, a data acquisition device is used to possibly record the ground surface of the workpiece digitally and compare it with set values. If the deviation detected in this way is greater than a predetermined limit value, grinding parameters are changed to achieve the best possible grinding result for the next workpiece. DE 10 2018 202 618 A1 describes a method in which the ground workpiece is detected using a thermography device. However, the disadvantage is that the workpiece produced with the excessive deviation is treated as scrap and can not be sold. From DE 10 2010 011 470 B4 a method and a device is known in which a radar sensor is arranged on the tool carrier that measures the surface of the workpiece during machining.

It is also known from the prior art to monitor the wear of the abrasive. Methods for this can be found, for example, in DE 10 2017 208 498 A1 or DE 10 2017 106 548 A1. This makes it possible to detect when the wear of an abrasive leads to problems with the grinding result.

The invention is based on the task of proposing a method for grinding a surface of a workpiece, with which it is possible to react quickly and reliably to variations and continuous changes in the grinding result caused by wear of the tools, in order, on the one hand, to reduce the amount of scrap produced, to ensure a product quality that is consistent in the result and to increase the expected service life of the tools.

The invention solves the set task by a method for grinding a surface of a workpiece by means of a grinding machine comprising at least two grinding units, the method comprising the following steps:

a. Providing a description of a target structure of the surface to be achieved,
b. Grinding the surface by means of a first of the at least two grinding units, using a predetermined set of grinding parameters,
c. Capturing an actual structure of the ground surface,
d. Comparing the captured actual structure with the target structure,
e. adjusting a set of grinding parameters of a second of said at least two grinding units depending on said comparison; and
f. Grinding the surface by means of the second of the at least two grinding units, using the adjusted set of grinding parameters.

In the method according to the invention, the surface of the workpiece is ground with the abrasives of at least two grinding units. In between, i.e. after the first grinding process in method step b, an actual structure of the surface that has already been ground once is captured. Based on the result of this comparison, the grinding parameters of the second grinding unit to be used are determined and adjusted. Then, the surface that has already been ground once is ground by means of the second grinding unit to be used, using the adjusted set of grinding parameters. Consequently, it is possible to react to the result of the first grinding operation with the second grinding operation and to compensate for any deviations, errors or inaccuracies that may have occurred. This is not possible with the methods of the prior art. There, it can only be determined after grinding whether the result is satisfactory. If this is not the case, the set of grinding parameters can be adjusted for the next or a later workpiece, thus improving the quality. However, the amount of scrap remains unchanged.

In a preferred embodiment, the target structure to be achieved relates to the structure to be achieved after the first grinding. In order to check the grinding result after completion of the method, it is advantageous to also determine a target end structure to be achieved and to provide a description of this target end structure. After grinding the workpiece with all the grinding units to be used, an actual structure can again be captured and compared with the target end structure. From this, important results can be obtained for later workpieces and the grinding parameters to be used for this.

The description of a target structure can be available in a variety of ways. In one embodiment, the description is provided in form of at least one digital image. This can be, for example, a digital photo of the surface design to be achieved. In a particularly preferred embodiment, this is a color photo that includes different wavelengths of light. Alternatively, multiple monochromatic photos may be used, each of which used light of only a single wavelength or a narrow wavelength range of, for example, less than 50 nm, preferably less than 30 nm, preferably less than 10 nm. Preferably, the description may also include images in the non-visible range, especially in the near-infrared range or in the UV range.

Preferably, the grinding machine has more than two grinding units and the surface is ground using more than two grinding units. Preferably, after the first grinding with the first of the grinding units to be used, an actual structure is captured, which is compared with a corresponding target structure. Since the surface, which has already been ground once in this way, is in this case still being processed with more than one grinding unit and is therefore still being ground with more than one abrasive, several sets of grinding parameters can be changed and adjusted. These are the grinding parameters of the grinding units that are still to be used. In this case, it is quite possible and also advantageous if several adjustment options are determined for the different sets of grinding parameters. It is then possible to select the adjustment of the different sets of grinding parameters which, for example, results in the lowest load and the least wear on the abrasives to be used, or the adjustment in which abrasives which are already relatively heavily worn are subjected to as little stress as possible.

In a particularly preferred embodiment, several descriptions of target structures to be achieved are provided, which particularly preferably correspond to the target structures to be achieved after the first grinding, after the second grinding and/or after further grinding processes. After each of the grinding processes for which a description of a target structure has been provided, an actual structure is preferably also captured, which is compared with the respective target structure. Based on this comparison, the sets of grinding parameters of all further grinding units to be used are preferably adjusted. This can lead to a situation where, in particular, the set of grinding parameters of a grinding unit to be used quite late in the production process is changed and adapted several times before it is actually used to machine the surface of the workpiece with the corresponding grinding unit.

In a preferred embodiment, before each grinding process in which one of the grinding units is used, an actual structure of the surface is captured and compared with the corresponding target structure. Based on the result of this comparison, the set of grinding parameters to be used during grinding with the respective grinding unit is adjusted. Particularly preferably, an actual structure of the surface is captured before grinding the surface with the first grinding unit to be used, which is advantageously, but not necessarily, the first grinding unit of the grinding machine. In this way, the first set of grinding parameters to be used, with which the first grinding unit to be used is operated and configured, can also be individually adapted to the conditions of the respective workpiece.

Advantageously, a wear condition of at least one abrasive of at least one of the grinding units is determined, wherein the set of grinding parameters of at least this grinding unit whose wear condition has been determined, but preferably of all grinding units to be used later, is adapted depending on the determined wear condition of the grinding unit. In this way, the deviations that can occur when grinding the surface with the abrasive in question are reduced, since an error occurring due to the wear of the abrasive or a corresponding deviation of the grinding result from the target structure can be counteracted in advance.

Preferably, the description of the target structure is an image of a reference surface or the reference surface itself. Preferably, the image is a photographic image. However, this is not necessary. Measurement data from other sensors, for example thermographic sensors, radar sensors or other sensors, can also be used, provided that a description of the surface can be provided by the measurement data. Which type of measurement data or description is actually chosen for the respective method depends on which properties the surface to be ground is to have after grinding. As a rule, the optical appearance of the surface is changed by grinding and is to be transformed into a desired appearance. Therefore, photographic images of a reference surface are usually used as a description of the target structure. In this case, the target structure is 2-dimensional or 3-dimensional. While, for example, grinding patterns to be introduced into a surface are more likely to correspond to a two-dimensional description of a target structure, three-dimensional descriptions of a target structure are more likely to be advantageous for workpieces that have an uneven surface.

Preferably, a set of grinding parameters includes a feed rate at which the workpiece is transported through the grinding machine, an abrasive speed at which the abrasive moves, a pressure at which the abrasive is pressed against the workpiece, and/or its spatial and/or temporal distribution. Additionally or alternatively, the set of grinding parameters preferably includes an abrasive to be selected within an grinding unit or the grinding unit itself to be selected. In addition or alternatively thereto, the type and/or quantity of the grinding aggregate(s) to be used and/or the abrasive(s) to be used therein is preferably determined depending on the result of the comparison between the captured actual structure and the target structure after or before a printing process. Additionally or alternatively, a path of at least one pressure shoe and/or pressure beam from a rest position to the grinding position is determined. The abrasive is preferably pressed against the surface to be ground by at least one pressure element. This is known, for example, in the case of abrasive belts. For this purpose, the abrasive belt is arranged between the respective pressure element and the workpiece to be ground, and the pressure element exerts pressure on the abrasive means in the direction of the workpiece to be ground. In particular, if the abrasive is pressed against the workpiece by a single pressure element, this is referred to as a pressure bar. This preferably extends over the entire width of the abrasive. If several pressure means are provided, which are preferably arranged next to each other, they are referred to as pressure shoes. If the respective abrasive is not used, no pressure is applied by the pressure element. The pressure element is then in the rest position. The distance that the pressure element must travel in order to apply an grinding pressure to the abrasive is preferably measured. The position in which the pressure element applies the pressure is called the grinding position.

Preferably, at least one set of grinding parameters, preferably all sets of grinding parameters, is predetermined and/or adjusted depending on sensor measurement data obtained from

- at least one sound, vibration and/or force measurement on a pressure shoe and/or pressure beam of at least one grinding unit,
- at least one displacement measurement on at least one pressure shoe and/or a pressure beam,
- at least one surface and/or thickness measurement of the workpiece,
- a roughness, temperature and/or slip measurement of at least one abrasive and/or
- a color, capacitive and/or geometric measurement of the surface of at least one abrasive.

Some of these measurements can be conducted before the actual grinding, in particular before the first grinding process. For example, the surface area and/or thickness of the workpiece to be ground can be determined prior to the first grinding process. This is preferably done at the entrance to the grinding machine. The roughness, the temperature and/or the slip of at least one abrasive material can be measured continuously, but preferably at least repeatedly. In this context, regular repetitions are advantageous, regardless of whether and, if so, how often the abrasive is used for grinding a workpiece.

The same applies to the measurement of the surface of the abrasive, from which a state of wear can be determined. The measurements, which are carried out on one or more pressure shoes or pressure beams of at least one grinding unit, are preferably carried out during the grinding process. They are preferably carried out several times during the grinding of a single workpiece. Of course, it is also possible to carry out the measurements on the pressure shoes or pressure beam only once for a workpiece. Advantageously, the measurement results are used to adjust as many as possible of the sets of grinding parameters of the grinding units to be used during grinding of the workpiece to be machined.

Advantageously, the grinding machine has more grinding units than are used for grinding. In other words, the surface of the workpiece is not ground by means of all the grinding units of the grinding machine. Preferably, the grinding units used or to be used are selected taking into account the state of wear of the abrasives of all grinding units. Thus, preferably, the abrasives and grinding units are used which, for example, have the lowest possible wear, in order to achieve the most uniform possible stress and the most uniform possible wear of all the abrasives of the grinding units. Alternatively, for example, a particularly worn abrasive can be selected in order to be able to replace the abrasive as soon as possible, provided that the time is favorable. If, for example, it is foreseeable that the abrasive would otherwise have to be replaced when the users of the grinding machine change shifts, this procedure is advantageous. This moves the timing forward so that it does not fall within the unfavorable time range. Consequently, by selecting the grinding units used or to be used, the timing at which individual abrasives are replaced can be changed in particular and shifted forward or backward, in which the abrasive is used more or less frequently.

In a particularly preferred embodiment, the position of the workpiece relative to at least one abrasive of at least one grinding unit is adjusted taking into account the state of wear of the abrasive. This is particularly advantageous if individual areas of an abrasive have greater wear than other areas. A belt grinder with an abrasive belt that moves parallel to the feed direction, for example, can be an example of such uneven wear. For example, if a plurality of workpieces are being ground and are placed on the left edge of a transport device that transports the workpieces through the grinding machine, the abrasive belt in the left area will also wear more than in the right area. It is therefore advantageous to adjust the position of the workpiece on the transport device and thus relative to the abrasive and the grinding unit, taking into account the state of wear, in order to prevent an abrasive from having to be replaced even though a spatial area of the abrasive has sufficient grinding effect for grinding processes.

Preferably, the workpiece is rejected as a scrap if, when comparing the captured actual structure with the target structure, it is captured that the target structure can not be achieved or if at least one parameter of the adapted set of grinding parameters lies outside a predetermined value range, whereby a feed rate is preferably increased. If the deviation of the captured actual structure from the target structure is so great that the target structure cannot be achieved by grinding in further grinding units, the workpiece is rejected as scrap in this embodiment of the method. Alternatively or additionally, this happens if the target structure can still be achieved, but the grinding parameters of the following grinding units or of the following grinding unit required for this contain at least one parameter that lies outside a predetermined value range. These can be, for example, parameters which, although possible, would, for example, damage the grinding unit and/or the abrasive or subject it to disproportionate wear. Particularly preferably, the feed rate at which the workpiece is conveyed through the grinding machine is increased if a workpiece is to be rejected as scrap.

The invention further solves the set task by a grinding machine for carrying out a method according to one of the preceding claims. The grinding machine preferably has an electronic or electrical control system, in particular an electronic data processing device, that is adapted to compare a captured actual structure with a description of a target structure, preferably stored in an electronic data memory, and, on the basis of the result of this comparison, to control the grinding units to be used subsequently in such a way that modified and adapted sets of grinding parameters are used. Preferably, the electronic data processing device has a comparison module for this purpose, which performs the actual comparison. A correction module determines the adjustments to be made to the set of grinding parameters from the result of this comparison. Preferably, this adjusted set of grinding parameters, or at least the adjustments and changes to be made to the previous set of grinding parameters, is transmitted to the respective grinding device by means of a communication module. The various modules described herein may also take the form of software and programs for electronic data processing device. If the grinding machine also has at least one sensor for determining the sensor measurement data described herein, it is advantageous if the correction module can access the sensor measurement and include it in the determination of the adjustments to be made.

Figure 2:
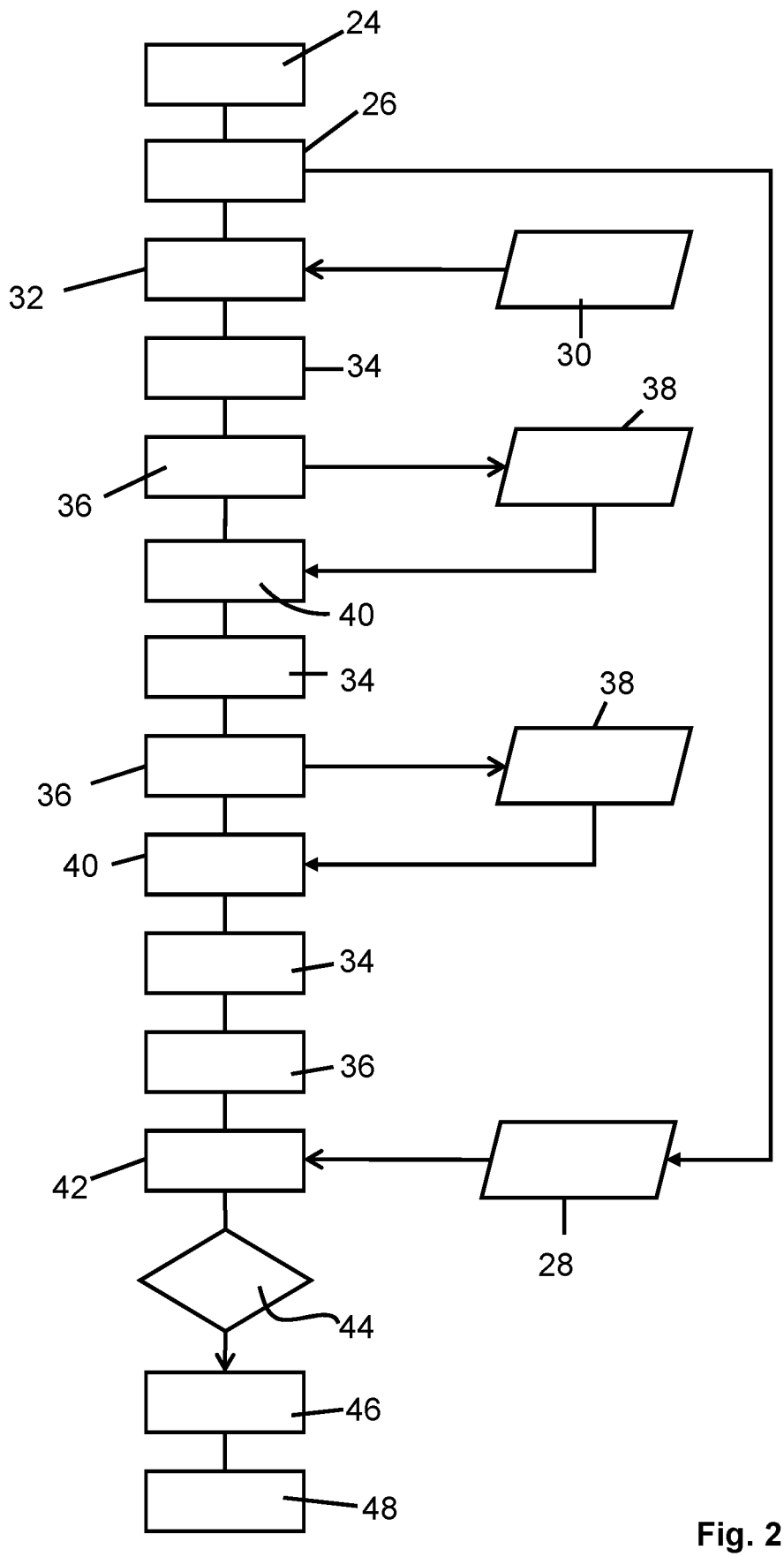

With the aid of the accompanying figures, some embodiments of the present invention are explained in more detail below. They show:

FIG. 1 schematic representation of a grinding machine according to an embodiment of the present invention, and FIG. 2 a flow diagram of a method according to a further embodiment of the present invention.

FIG. 1 schematically shows a grinding machine according to an embodiment of the present invention. It has three grinding units 2, each of which has an abrasive 4, in the example shown an abrasive belt. A conveyor belt 6 conveys the workpieces 5 to be ground, through the grinding machine along the direction indicated by the arrow 8.

The grinding machine shown in FIG. 1 has three surface sensors 12 that are adapted to capture an actual structure of the surface of the workpiece. The surface sensors 12 can be designed as cameras in the visible or non-visible wavelength range, 3D scanners or other sensors. A closing sensor 14, which is also designed as a surface sensor and which captures the finished grinding result, i.e. the actual structure after the last grinding process, is arranged behind the last grinding unit in the feed direction.

FIG. 1 also shows further measuring sensors 16 which are arranged within the individual grinding units 2. They exemplify different types of sensors which can be used to capture measured values on the basis of which an adapted set of grinding parameters can be determined or adjusted. In the embodiment example shown in FIG. 1, the measuring sensors 16 are adapted to determine the path of the pressure element 10 from the rest position shown in FIG. 1 to a grinding position.

Via signal lines 18, the signals captured by the sensors 12, 14, 16 are transmitted to an electronic data processing device 20. The signal lines 18 of the sensors 12, 14, 16 of the last grinding unit 2 are shown dashed to illustrate that these sensors 12, 14, 16 are optional and are not used for determining a customized set of grinding parameters. The electronic data processing device 20 has an input module 22 by means of which a user of the grinding machine can intervene in the control system, enter new parameters or otherwise operate the machine.

FIG. 2 shows schematically a sequence of a method according to an embodiment of the present invention. After the start 24 of the method, parameters of the workpiece to be ground, in particular its width and/or thickness, are recognized by means of a workpiece recognition device 26 and initially stored. These parameters and data relating to the workpieces are used to achieve uniform stressing of the abrasive means 4 in the electronic data processing device 20. This is done in the stressing module 28 of the electronic data processing device, to which the data and parameters are passed. This module may also be in the form of a computer program product, for example software. In the next method step, surface data describing the target structure are provided from a data memory 30. This data can be available 2-dimensional or 3-dimensional and is transferred to a target structure module 32, which provides a machine-readable description of the target structure.

In the next step, the actual structure is captured 34, which is then compared to the target structure in a comparison module 36 of the electronic data processing device 20. If this comparison indicates that an adjusted set of grinding parameters needs to be determined, this information is passed to an adjustment module 38 in which the new adjusted set of grinding parameters is determined. Using this adjusted set of grinding parameters, the surface of the workpiece is ground in the next method step, referred to as grinding 40.

If the comparison indicates that an adjusted set of grinding parameters does not need to be determined, the comparison module 36 preferably passes this information directly to the next grinding unit or electronic data processing device 20 and grinding 40 takes place immediately after the comparison.

The surface ground in this way is again subjected to an actual structure detection 34, the result of which is again compared in the comparison module 36 with the target structure, whereupon, if necessary, an adapted set of grinding parameters is determined in the adjustment module 38. Alternatively, grinding 40 is performed again without adjusted grinding parameters. The same module can be used several times as comparison module 36. Alternatively, different modules can be used as comparison module 36. This is particularly advantageous if different measured values and/or different parameters are used in order to use the actual structure and/or the respective target structure. The same applies to the adjustment module 38.

In the method sequence shown in FIG. 2, after the last grinding 40, the actual structure is again captured 34 and compared with the target structure in a comparison module 36. In this way, the grinding quality can be assessed and, for example, scrap can be detected. In a display step 42, the user of the grinding machine is shown how heavily the respective abrasive 4 is stressed and/or worn. This is preferably indicated as location-dependent information, preferably depending on the grinding width and/or depending on the position relative to the width of the abrasive.

In a final quality control 44, the last comparison of the actual structure with the target structure is used to assess whether the workpiece is a scrap. If this is not the case, the workpiece is sent for further processing 46, for example packaging. The method then ends 48.

All modules described are preferably part of the electronic data processing device 20 and are designed as software, i.e. computer program product.

LIST OF REFERENCE NUMBERS

2 Grinding unit
4 Abrasive
5 Workpiece
6 Conveyor belt
8 Arrow
10 Pressure element
12 Surface sensor
14 Closing sensor
16 Measuring sensor
18 Signal line
20 Electronic data processing device
22 Input module
24 Start
26 Workpiece recognition
28 Stress module
30 Data memory
32 Target structure module
34 Actual structure detection
36 Comparison module
38 Adjustment module
40 Grinding
42 Display step
44 Quality control
46 Further processing
48 End

The invention claimed is:

1. A method for grinding a surface of a workpiece with a grinding machine comprising at least three grinding units, comprising:
   determining one or more among the at least three grinding units to not be used for the grinding, based on a respective state of wear of all of the at least three grinding units, the determining being configured such that at least two of the grinding units will be used;
   providing a description of a target structure of the surface to be achieved;
   grinding the surface of the workpiece with one of said at least two grinding units using a predetermined set of grinding parameters so as to produce a ground surface;
   capturing an actual structure of the ground surface;
   comparing the captured actual structure with the target structure;
   adjusting a set of grinding parameters of another of said at least two grinding units depending on said comparison; and
   grinding the surface of the workpiece with said another of said at least two grinding units using the adjusted set of grinding parameters.

2. The method according to claim 1, wherein before each grinding step the actual structure of the surface is captured by one of said at least two grinding units and compared with the target structure, and the set of grinding parameters to be used during grinding is adjusted depending on the result of the comparison.

3. The method according to claim 1 further comprising determining a wear condition of at least one abrasive of at least one of said at least two grinding units, and wherein the adjusted set of grinding parameters is adapted based at least in part on the determined wear condition.

4. The method of claim 1 wherein the description of the target structure is an image of a reference surface or the reference surface.

5. The method of claim 1 wherein the target structure is 2-dimensional or 3-dimensional.

6. The method of claim 1 wherein the adjusted set of grinding parameters comprises one or more of
- a feed rate,
- an abrasive speed,
- a pressure or spatial and/or temporal distribution of the pressure with which an abrasive is pressed against the workpiece, and
- a path of at least one pressure shoe and/or pressure beam from a rest position to a grinding position.

7. The method of claim 1 further comprising adjusting, based at least in part on a state of wear of the abrasive, a position of the workpiece relative to at least one abrasive of at least one grinding unit of said at least two grinding units.

8. The method of claim 1 further comprising rejecting the workpiece as scrap if, when comparing the captured actual structure with the target structure, it is detected that the target structure cannot be achieved or if at least one parameter of the adjusted set of grinding parameters is outside a predetermined value range.

* * * * *